United States Patent
Moya et al.

(10) Patent No.: US 9,821,227 B2
(45) Date of Patent: Nov. 21, 2017

(54) COMPOSING AN IMAGE

(71) Applicant: KING.COM LIMITED, St. Julians (MT)

(72) Inventors: Juan Antonio Moya, Barcelona (ES); David Picon, Barcelona (ES); Oriol Canudas, Barcelona (ES)

(73) Assignee: KING.COM LTD., St. Julians (MT)

( * ) Notice: Subject to any disclaimer, the term of this patent is extended or adjusted under 35 U.S.C. 154(b) by 51 days.

(21) Appl. No.: 14/825,518

(22) Filed: Aug. 13, 2015

(65) Prior Publication Data

US 2016/0045827 A1    Feb. 18, 2016

Related U.S. Application Data

(60) Provisional application No. 62/036,831, filed on Aug. 13, 2014.

(51) Int. Cl.
    G09G 5/00        (2006.01)
    A63F 13/52       (2014.01)
    G06T 11/00       (2006.01)
    A63F 13/60       (2014.01)
    A63F 13/332      (2014.01)
    (Continued)

(52) U.S. Cl.
    CPC ........... *A63F 13/52* (2014.09); *A63F 13/332* (2014.09); *A63F 13/335* (2014.09); *A63F 13/47* (2014.09); *A63F 13/60* (2014.09); *G06T 11/001* (2013.01)

(58) Field of Classification Search
    None
    See application file for complete search history.

(56) References Cited

U.S. PATENT DOCUMENTS

| | | | | |
|---|---|---|---|---|
| 8,564,595 B1* | 10/2013 | Ho | ............ | A63F 13/00 345/426 |
| 2005/0171754 A1* | 8/2005 | Santodomingo | ........ | G06T 17/05 703/21 |

(Continued)

FOREIGN PATENT DOCUMENTS

EP    2556868 A1    2/2013

OTHER PUBLICATIONS

International Search Report, dated Feb. 25, 2016, and Written Opinion issued in corresponding PCT Application No. PCT Application No. PCT/EP2015/068709.

(Continued)

*Primary Examiner* — Xiao Wu
*Assistant Examiner* — Mohammad H Akhavannik
(74) *Attorney, Agent, or Firm* — Saul Ewing Arnstein & Lehr LLP

(57) ABSTRACT

The invention relates to a computer implemented method for controlling the display of a tile image on a display of the computer device, the method comprising: storing in a computer memory at the computer device, image texture data comprising a plurality of sets of predefined masks, each set of predefined masks for forming a respective tile image; selecting at random a tile image for display from a plurality of tile images; determining a location of each mask in the set of predefined masks for forming the selected tile image, in the image texture data; and supplying an indication of said location to a shader program executed on the computer device to control the shader program to use the set of predefined masks to form the selected tile image on said display.

27 Claims, 12 Drawing Sheets

(51) Int. Cl.
*A63F 13/335* (2014.01)
*A63F 13/47* (2014.01)

(56) References Cited

U.S. PATENT DOCUMENTS

2008/0016176 A1   1/2008  Leitner et al.
2013/0293565 A1* 11/2013  Arvo .................. G06T 9/00
                                                345/589
2015/0348280 A1* 12/2015  Oriol ................. G06T 7/40
                                                345/582

OTHER PUBLICATIONS

Anonymous, "SneferTileExplain.jpg", (image contained in "Texture Atlas—polycount," Polycount, retrieved from the Internet: URL:http://wiki/polycount.com/w/index.pho?title=Texture_atlas&oldid=4634 [retrieved on Nov. 23, 2015] XP055230518, Aug. 4, 2014, previously cited).

Partial International Search Report, dated Dec. 11, 2015, issued in corresponding International Application No. PCT/EP2015/068709.

Anonymous, "Channel Packing—polycount", Polycount, retrieved from the Internet: URL:http://wiki.polycount.com/w/index.php?title=ChannelPacking&oldid=1677 [retrieved on Nov. 23, 2015] XP055230491, Jul. 29, 2014.

Anonymous, "Texture atlas—polycount", Polycount, retrieved from the Internet: URL:http://wiki/polycount.com/w/index.pho?title=Texture_atlas&oldid=4634 [retrieved on Nov. 23, 2015] XP055230518, Aug. 4, 2014.

Anonymous, "What can you do with 3498 tris?—polycount", Polycount, retrieved from the Internet: URL:http://polycount.com/discussion/87372/what-can-hou-do-with-3498-tris [retrieved on Nov. 23, 2015] XP055230530, Aug. 4, 2011, 1, 4.

Daley, Michael, "Learning iOS Game Programming, Chapter 9: Tile Maps; Introduction to Tile Maps; Creating a Tile Map; Tie Map Classes ED—Michael Daley", Learning IOS Game Programming, Addison-Wesley Professional, ISBN: 0-321-69942-4 XP002665776, Sep. 3, 2010, 1-44.

Welch, Ed, "Texture Atlas Maker—CodeProject", CodeProject, retrieved from the Internet: URL:http://www.codeproject.com/Articles/330742/Texture-Atlas_Maker [retrieved on Nov. 24, 2015) XP055230791, Apr. 1, 2012, 1-6.

* cited by examiner

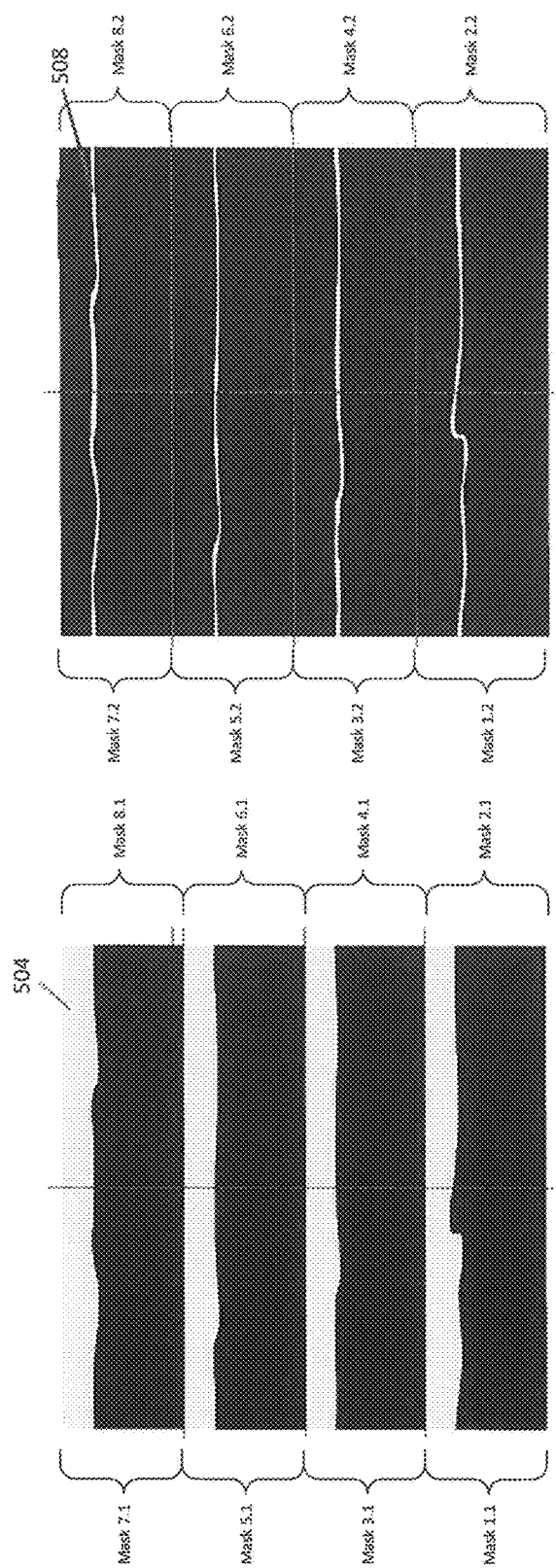

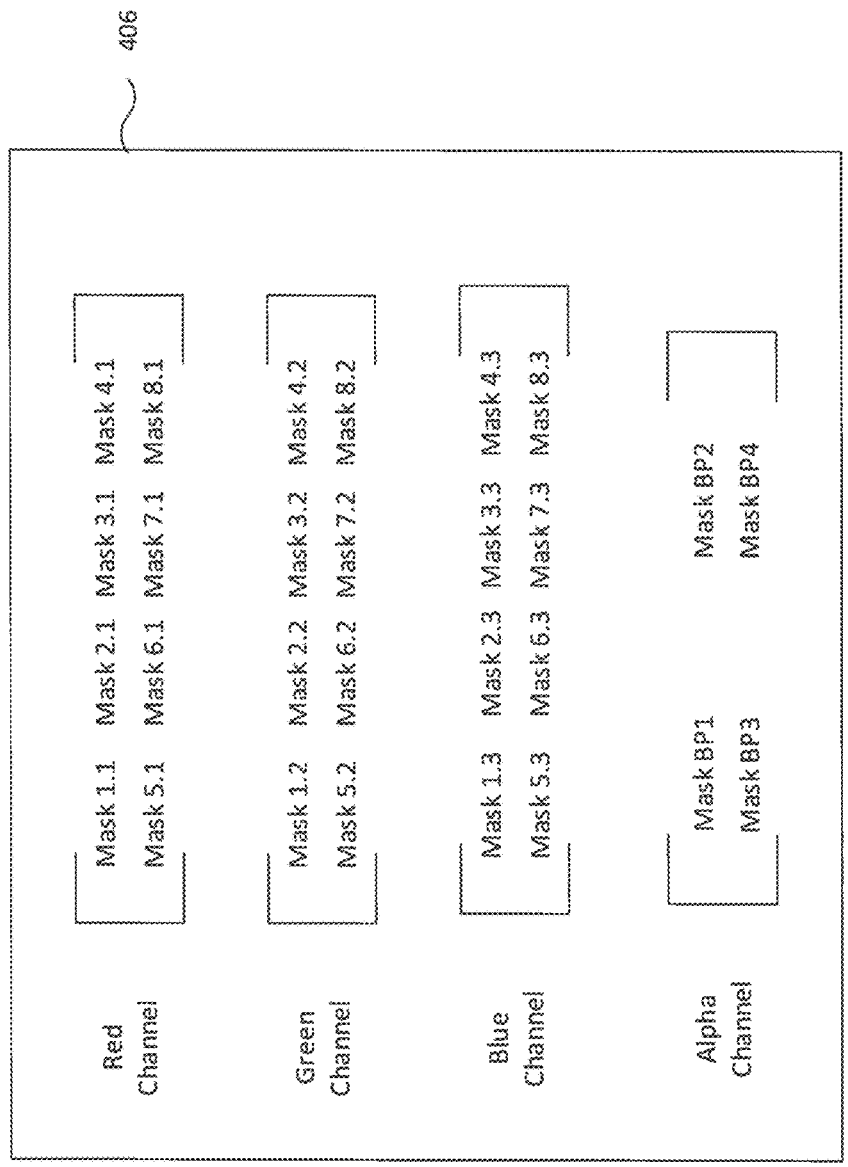

COMPOSING AN IMAGE

CROSS-REFERENCE TO RELATED APPLICATIONS

This application is based on, and claims priority to U.S. Provisional Application No. 62/036,831, filed Aug. 13, 2014, the entire contents of which being fully incorporated herein by reference.

BACKGROUND OF THE INVENTION

There are many technical challenges and technical considerations facing the designer of applications (often referred to as "apps") that are to be executed on computer devices. An application comprises a data package that can be downloaded by a user of a computer device from an "app store" server that is associated with a provider of the app store. User installed applications can take a variety of forms such as games, communication programs, daily planners, ebook readers, geopositioning trackers, alert systems, etc.

The provider of the app store may impose limitations on the size of a data package that can be submitted to the app store by a designer. Even stricter limitations on the size of a data package are imposed by providers of app stores if the designer wishes the data package to be downloadable over a cellular network rather than over a wireless local area network, such as a Wi-Fi network.

A known computer game application executed at a computer device involves the matching of objects displayed on a game area (also referred to as a game board) and the elimination of such to complete a level or aim or target score of such a game. The game may be a so-called "casual" or "social" game, wherein short periods of play are undertaken by the user whenever appropriate according to the user's schedule.

SUMMARY OF THE INVENTION

In the context of games it is common for the game area referred to above to be superimposed over a background image. The inventors have identified that it desirable to have aesthetically pleasing backgrounds that are not repetitive and that change as the user advances to more difficult and different levels. However the limitations imposed by the providers of the app stores as to the final data package size of the application limits the number of images that can be stored in the data package for use as backgrounds.

The inventors have identified a way to create on a local device thousands of combinations of aesthetically pleasing backgrounds can be created that will not repeat to the human eye, without downloading these combinations to the local device. An end effect can be achieved at the local device without exceeding the download requirements for apps.

In the described embodiment, an image file is downloaded with an application to be executed on a computer device, the application being for example to allow a user to play a game on the computer device. The image file comprises a plurality of sets of predefined masks and is sufficiently low in storage requirement that it can readily be stored at the computer device itself. There is no need for the application while it is being executed by the local processor of the device to remotely access this image file, because it is in local storage. Nevertheless, when the application is executed it can generate a very large number of different backgrounds by accessing randomly one or more sets of predefined masks each time a new background is required without increasing the overhead storage.

According to one aspect of the present disclosure there is provided a computer implemented method for controlling the display of a tile image on a display of the computer device, the method comprising: storing in a computer memory at the computer device, image texture data comprising a plurality of sets of predefined masks, each set of predefined masks for forming a respective tile image; selecting at random a tile image for display from a plurality of tile images; determining a location of each mask in the set of predefined masks for forming the selected tile image, in the image texture data; and supplying an indication of said location to a shader program executed on the computer device to control the shader program to use the set of predefined masks to form the selected tile image on said display.

Each of the predefined masks for forming a tile image have a predefined colour value for a respective portion of the tile image, and the method may further comprise querying a memory of the computer device to determine tint colours to be applied to each of the predefined masks of the selected tile image, and supplying an indication of the determined tint colours to the shader program to adjust the predefined colour value of each of the predefined masks of the selected tile image using the determined tint colours.

The method may further comprise selecting a shade adjustment parameter at random, and using the shade adjustment parameter to adjust at least one of the determined tint colours prior to supply to the shader program, or supplying the shade adjustment parameter to the shader program to adjust at least one of the determined tint colours.

In an embodiment wherein the code is computer game code the tint colours may be determined based on a user's progression in the computer game.

The method may further comprise selecting a vertical scale adjustment parameter at random, and using the vertical scale adjustment parameter to adjust a vertical height of a rectangle onto which the predefined masks are to be mapped onto by the shader program prior to supply of the rectangle to the shader program, or supplying the vertical scale adjustment parameter to the shader program to adjust the vertical height of a rectangle onto which the predefined masks are to be mapped onto by the shader program.

The image texture data comprises a plurality of sets of pattern tiles, each set comprising a plurality of pattern tiles for overlaying over the selected tile image, and the method further comprises: determining a set of pattern tiles from the plurality of sets, to select pattern tiles from; selecting at random pattern tiles from the determined set of pattern tiles; determining a location of the selected pattern tiles in the image texture data; and supplying an indication of said location to the shader program to control the shader program to overlay the selected pattern tiles over the selected tile image on said display.

In an embodiment wherein the code is computer game code the set of pattern tiles may be determined based on a user's progression in the computer game.

The selected pattern tiles are defined by colour values in the image texture data, and the method may further comprise selecting a shade adjustment parameter at random, and supplying the shade adjustment parameter to the shader program to adjust the colour values of the selected pattern tiles.

The pattern tiles may be binary images, grayscale images or colour images.

The method may further comprise determining at random that the tile image is to be flipped horizontally prior to display, and controlling the shader program to flip the tile image prior to display based on said determination.

In one embodiment, for each of the plurality of sets of predefined masks, the image texture data associated with each of the predefined masks in the set is stored in a respective channel of an image file.

The image texture data may comprise a plurality of sets of pattern tiles, each set comprising a plurality of pattern tiles for overlaying over the selected tile image, the plurality of sets of pattern tiles stored in a further channel of said image file.

The predefined masks may be binary images, grayscale images or colour images.

According to another aspect of the present disclosure there is provided a computer program product for controlling the display of a tile image on a display of a computer device, the computer program product comprising code embodied on a computer-readable medium and being configured so as when executed on a processor of the computer to: supply image texture data to a shader program executed on the computer device, the image texture data comprising a plurality of sets of predefined masks, each set of predefined masks for forming a respective tile image; select at random the tile image for display from the plurality of tile images; determine a location of the set of predefined masks for forming the selected tile, in the image texture data; and supply an indication of said location to the shader program to control the shader program to use the set of predefined masks to form the selected tile image on said display.

Another aspect of the invention provides a computer device comprising: a memory adapted to store image texture data; processing components configured to execute game code to carry out the steps of the above-mentioned method and to execute a shader program; and a display for displaying tile images.

Another aspect of the invention provides a computer device configured to generate and transmit a computer game code package to each of a plurality of user devices, wherein the computer game code package comprises: a computer program product as mentioned above; a shader program adapted to be executed on each user device and to receive image texture data from the computer program product and to use a set of predefined masks in the image texture data to form a selected tile image on a display of each user device; and an image file containing the image texture data comprising a plurality of sets of predefined masks, each set of predefined masks for forming a respective tile image.

Another aspect of the invention provides a method of producing a tile image to be displayed comprising: combining a first greyscale image, said first greyscale image having a greyscale value for a first portion of the image, a second greyscale image, said second greyscale image having a greyscale value for second portion of the image, said first portion and second portions separated by a boundary, and a third greyscale image, said third greyscale image having a greyscale value for the boundary; applying a tint colour to each of the greyscale images, whereby the greyscale value of each image is adjusted by the tint colours; overlaying over the first, second and third portions of the image a fourth greyscale image, said fourth greyscale image comprising a pattern for the tile.

BRIEF DESCRIPTION OF DRAWINGS

For a better understanding of the present subject matter and to show how the same may be carried into effect, reference will now be made by way of example to the accompanying drawings in which:

FIGS. 6*a-d* illustrates predefined masks for composing a plurality of tile images is a schematic block diagram of an example data package;

FIG. 7 illustrates data stored in an example file of the data package;

DETAILED DESCRIPTION OF THE INVENTION

Embodiments will now be described by way of example only.

Figure 1:
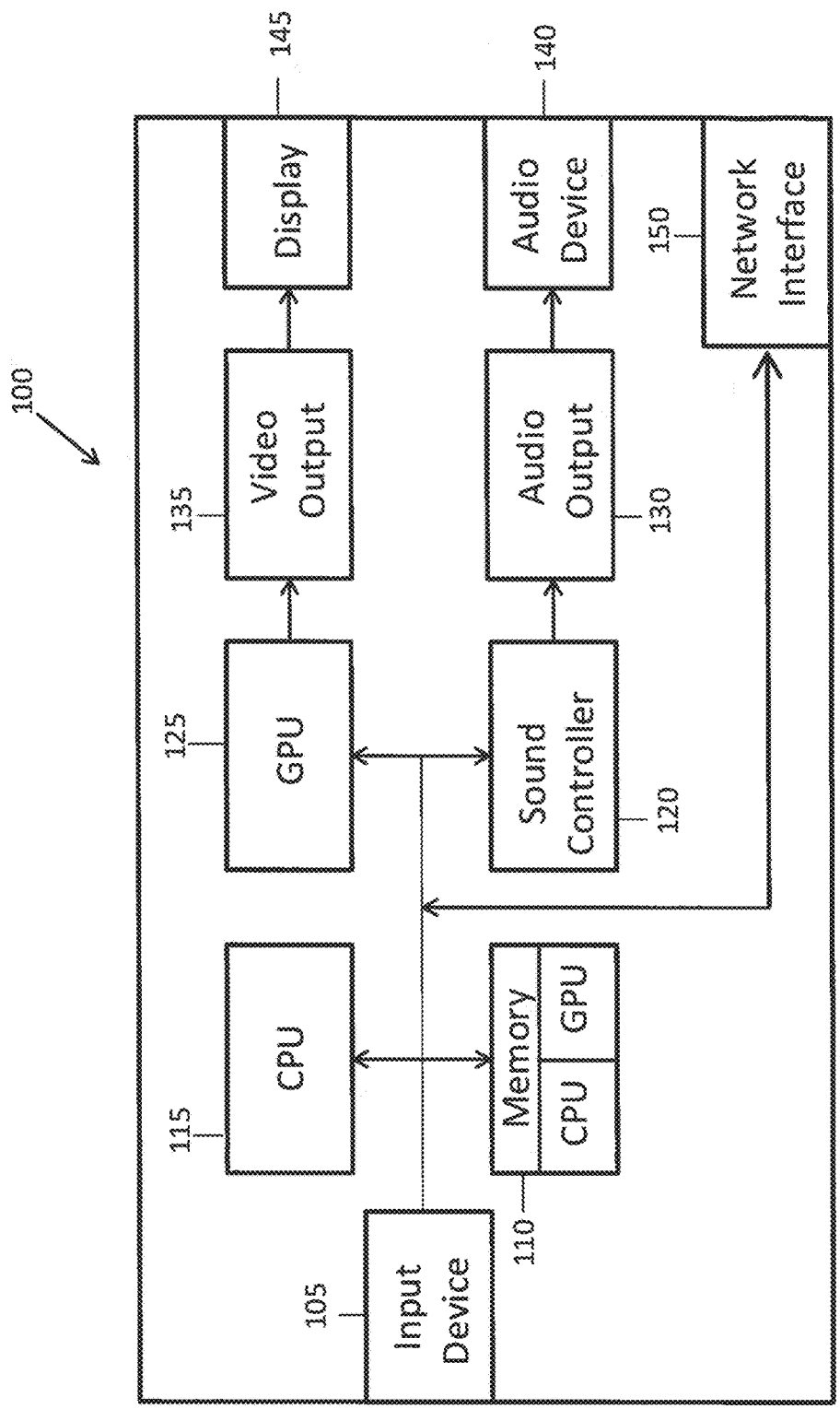
FIG. 1 is a schematic block diagram of a computer device.

A schematic view of a user or computer device 100 according to an embodiment is shown in FIG. 1. The computer device 100 may be for example, a mobile phone, a personal digital assistant ("PDA"), a personal computer ("PC"), a tablet computer, a gaming device. All of the blocks shown are implemented by suitable circuitry. The blocks may be implemented in hardware and/or software.

The computer device 100 comprises a central processing unit ("CPU") 115, to which is connected an input device 105, memory 110, a graphics processing unit ("GPU") 125 and a sound controller 120 via an interconnect such as a bus or any other suitable interconnect.

In the field of computer graphics, it is known to use specialized graphics processing units or GPUs to provide hardware-based acceleration of certain graphics operations. The CPU 115 may send commands to the GPU 125 to implement a particular graphics processing task. As an example, a contemporary GPU may perform operations such as texture mapping, high-speed polygon rendering, and shading in hardware circuitry having a highly parallel structure for high processing throughput. Processing performed by a GPU is generally for purposes of rendering graphical images of an application program on a graphical display. GPUs are especially useful for many graphics-intensive computer applications, including video games.

The GPU 125 is configured to provide a video output 135. The video output 235 is provided to a display 145. The sound controller 120 is configured to provide an audio output 130. The audio output 130 is provided to an audio device 140 such as a speaker and/or earphone(s). The input device 105 can take any suitable format and can be one or more of a keyboard, mouse, touch screen, joystick or game controller The computer device 100 has a network interface 150 allowing the device to be able to communicate with a network such as the Internet or other communication infrastructure. It should be appreciated that the display 145 may in some embodiments also provide the input device 105 by way of an integrated touch screen for example.

The memory 110 may comprise a portion dedicated to the CPU 115 and a portion dedicated to the GPU 125.

The computer device 100 is shown by way of example only. In alternative embodiments, one or more of the parts may be omitted. Alternatively or additionally, some embodiments may comprise one or more other parts. Alternatively or additionally, one or more parts may be combined.

Figure 2:
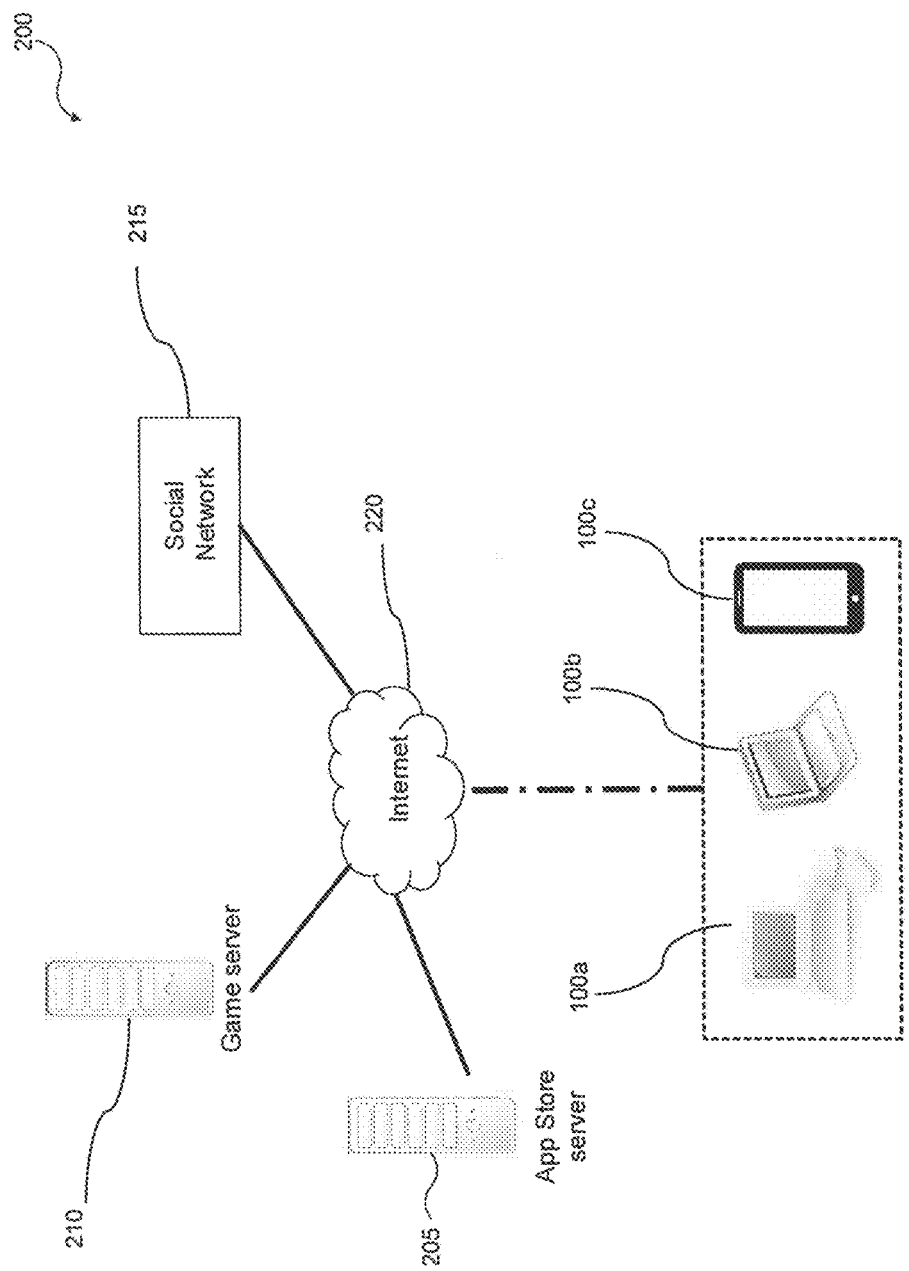
FIG. 2 is a schematic illustration of a communication system.

FIG. 2 schematically shows a system 200 comprising an app store server 205 and a game server 210. A user of the computer device 100 may operate the computer device 100 to access an app store and download a computer game from an app store server 205 over the Internet 220.

The game server 210 may store databases of game players' details, profiles, high scores and so on. In practice, one or more databases may be provided. Where more than one game server is provided, the database(s) may be provided in one database or across two or more servers 210. The server 210 may also have a games data function. This may comprise a memory to store the computer game program and a processor to run the games program. The server 210 may communicate via for instance the internet 220 to one or more computer devices 305 and may further provide connections to a social network 215 such as Facebook™.

It should be appreciated that embodiments may be deployed in different system architectures. For example, the computer game may be implemented as a computer game that is stored in the CPU portion of memory 110 of the computer device 100 and is run on the processor 115 of the user device 200. However, the server 210 may handle some elements of the game in some embodiments. By way of example only, a Java game applet may be provided to the computer device 100 and the locally running Java applet will generate, for example, the graphics, sounds, and user interaction for the game play on the computer device 100. Some data may be fed back to the game server 210 to allow interaction with other computer devices 100. The data which is fed back may also allow scoring and/or cross platform synchronization.

Figure 3:
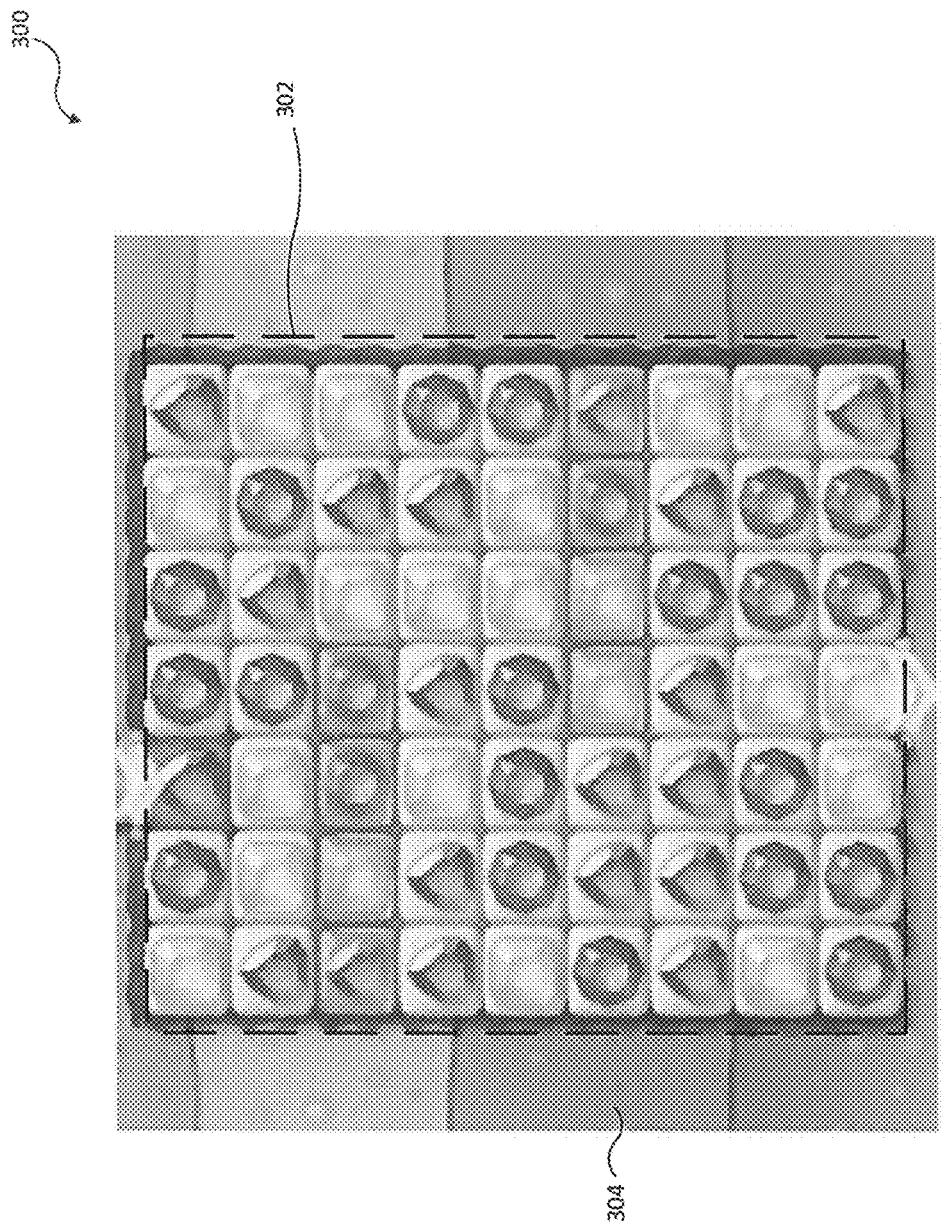
FIG. 3 shows an example game board arrangement.

Reference is now made to FIG. 3 which illustrates a game area 302 that is superimposed over a background 304 which may both be rendered on display 145 following execution of video game code on the CPU 115.

The ideas described in the present disclosure are described in the context of the game 'Diamond Digger Saga' by King.

Each of the levels in this game are divided up in a plurality of 'rooms' where the player within the level advances from room to room. The rooms are connected with entry and exit points and the player can adjust his gameplay to advance the game through a certain exit point in to a different room. All levels are divided into episodes, in other words each episode comprises a plurality of levels. There is a plurality of episodes in the game. The content of the game area 302 is beyond the scope of the present application.

It is desirable to have aesthetically pleasing backgrounds yet have backgrounds that are not repetitive and change from episode to episode. Using conventional techniques if four different full screen images were required for use as backgrounds for each episode, the designer would soon run out of space in the data package for the rest of the game code, therefore the designer must compromise on the amount of different backgrounds delivered in-game.

Figure 4:
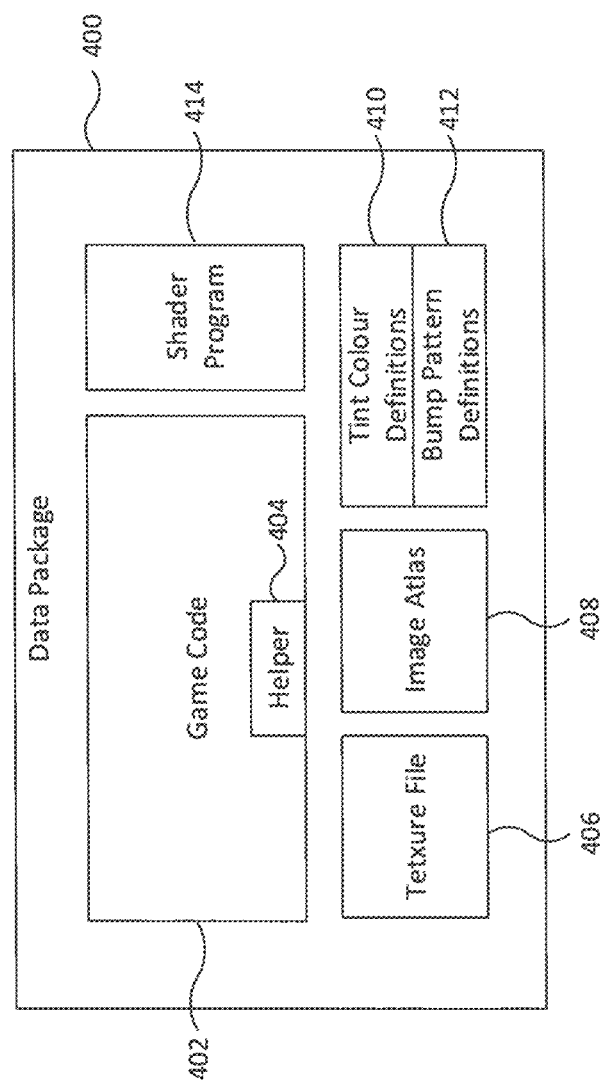
FIG. 4 is a schematic block diagram of an example data package.

Reference is now made to FIG. 4 which illustrates an example data package 400 in accordance with embodiments of the present disclosure. The game data package 400 may be transmitted from the app store server 205 over the Internet 220 to the computer device 100. The contents of the data package 400 shown in FIG. 4 are stored in memory 110 upon receipt of the data package 400 at the computer device 100 via the network interface 150. Once the install of the data package on computer device 100 is completed, the game is playable and every single asset required for embodiments of the present invention to be implemented are present on the device 100. It will be appreciated that when new game levels are downloaded from the server (which can occur after installation of the game on a device) the data package for a new level can include the basic tint colour definitions for that level. In fact, each of data sets 406, 408, 410 and 412 may be supplied separately from a main game package.

As shown in the FIG. 4, the data package 400 comprises game code 402. The game code 402 is arranged for execution on CPU 115. Embodiments are described below with reference to a shader program 414 running on the GPU 125. In these embodiments, the game code 402 communicates with the GPU 125, and provides it with the shader program 414 (the operation of which is described in further detail below) to be executed on the GPU 125.

The data package 400 further comprises a texture file 406. The texture file 406 is an image file comprising a plurality of channels. Persons skilled in the art will be aware that there are a wide variety of image formats that can store a plurality of colour components. For example the texture file 406 may be in the portable network graphics (PNG) format which comprises a red channel, a green channel, a blue channel and may also include an alpha channel.

The data package 400 further comprises a shader program 414. The shader program 414 is preferably executed on the GPU 125, however as an alternative may be executed on CPU 115 if for example the computer device 100 is not capable of running a shader program on the GPU 125. The shader program 414 is written in a shading language such as GLSL (OpenGL Shading Language). The texture file 406 is tailored to be digested by the shader program 414. The shader program 414 comprises a vertex shader and a fragment shader. The vertex shader defined by the OpenGL standard performs transformation operations on vertex data that is input into the vertex shader. These operations include transforming the vertex position into a screen position for use by a rasterizer and generating texture coordinates for texturing. Transformed vertex data output from vertex shader is supplied to a rasterizer which is configured to perform rasterization. Rasterization refers to an image rendering process in which an image described in a vector graphics format using polygons (e.g. triangles), is converted into a raster image containing pixels. The fragment shader is responsible for controlling the final colour for each pixel that will fill the image space between the vertices to be drawn. A pixel is each point discretized in the rasterization area that corresponds to a drawing element or unit to the final image or drawing device controlled by the GPU 125. Functionality of a vertex shader and a fragment shader is well understood by persons skilled in the art and is therefore not discussed in further detail herein. In embodiments of the present disclosure helper code 404 is operable to pass information to the vertex shader of the shader program 414 by way of vertex buffers. Example code for the vertex shader is provided below:

```
Vertex Shader attribute highp vec4 a_position;
attribute mediump vec2 a_texCoord;
attribute mediump vec4 a_texCoord2; // xy coords are origin uv of
the color texture, zw coords are texture scaling
attribute mediump float a_tileSelected;
uniform highp mat4 u_modelViewProjectMatrix;
varying mediump vec4 v_texCoord; // xy coords are color texture coord,
zw are World Scale of image
varying mediump vec3 v_texOrigin; // xy Tile color texture origin, z is
random start for tiles
void main( ) {
    gl_Position = u_modelViewProjectMatrix * a_position;
    v_texCoord.xy = a_texCoord;
```

```
Vertex Shader v_texCoord.zw = a_texCoord2.xy;
    v_texOrigin.xy = a_texCoord2.zw;
    v_texOrigin.z = a_tileSelected;
}
```

The vertex shader will decode each vertex buffer and reorder that information to pass it to the fragment shader, where the final colour composition will be done.

Example helper code 404 is provided below in which vertex buffers defined as "Colors2" and "RowSelected" are used to pass information to the vertex shader.

```
ProceduralBackgroundHelper.cpp

CVertexBuffer* uvBufferScale = mesh->GetVertexBuffer(CMeshData: :mColors2BufferName);
    if (uvBufferScale) == nullptr)
    {
       uvBufferScale = mesh->AddVertexBuffer(
          CMeshData: :mColors2BufferName,
          CVertexBuffer: :DATA_TYPE_FLOAT,
          CVertexBuffer: :CONTENT_TYPE_DATA,
          4
       );
    }
    if(uvBufferScale != nullptr)
    {
       // Fill in the data for the Colors2 buffer. The data to feed is:
       // - texture scaling (stretch applied) encoded in first,second component at each
vertex
       // - origin uv coordinates of the bump pattern row in the atlas, encoded in
third,fourth component at each vertex
       float* fuvBufferScale = static_cast<float*>(uvBufferScale->GetData( ));
       for(int != 0; i < 4; ++i)
       {
          fuvBufferScale[4*i] = scale.x / width * tileScale;
          fuvBufferScale[4*i+1] = scale.y / height * aspectRatio * tileScale;
          fuvBufferScale[4*i+2] = origin.x;
          fuvBufferScale[4*i+3] = origin.y;
       }
    }
    CVertexBuffer* uvBufferRow = mesh->GetVertexBuffer(Game: :StringID("RowSelected"));
    if (uvBufferRow == nullptr)
    {
       uvBufferScale = mesh->AddVertexBuffer(
          Game: :StringID("RowSelected")
          CVertexBuffer: :DATA_TYPE_FLOAT,
          CVertexBuffer: :CONTENT_TYPE_DATA,
          1
       );
    }
    if(uvBufferRow != nullptr)
    {
       // Fill in the data for the RowSelected buffer. Encodes the bump tile offset in a
single component
       float* fuvBufferRow = static_cast<float*>(uvBufferRow->GetData( ));
       for (int i = 0; i < 4; ++i)
       {
          fuvBufferRow[i] = randomStart;
       }
    }
```

The "Colors2" vertex buffer is named "a_texCoord2" in the vertex shader, and the "RowSelected" vertex buffer is named "a_tileSelected" in the vertex shader.

Example code for the fragment shader is provided below:

```
                            Fragment Shader
varying mediump vec4 v_texCoord; // xy coords are color texture coord, zw are World
Scale of image
varying mediump vec3 v_texOrigin; // xy Tile color texture origin, z is row selected
for tiles
uniform lowp vec4 u_color4;
uniform lowp vec4 u_materialAmbient;
uniform lowp vec4 u_materialDiffuse;
uniform sampler2D u_texture;
// A blend overlay technique. It applies color Multiply when range is dark shadows and
Inverse of multiply when in highlights.
#define Blend(base, color, funcf)          vec3(funcf(base, color.r), funcf(base,
color.g), (funcf(base, color.b))
#define Multiply(base, color)              (2.0 * base * color)
#define InvMultiply(base, color)           (1.0 − 2.0 * (1.0 − base) * (1.0 − color))
#define BlendOverlay(base, color)          base <= 0.495 ? Blend(base, color, Multiply) :
Blend(base, color, InvMultiply)
#define MaxRGE(channel1, channel2, channel3) max( max( channel1, channel2 ), channel3
)
void main ( )
{
        // Compute the bump tile coordinate to use, reverting the scale stretch applied.
        // Span it horizontally to the bump pattern row and Repeat when off coords
        mediump vec2 bumpTiledUV = vec2(
            mod((v_texCoord.x − v_texOrigin.x) * v_texCoord.z + v_texOrigin.y +
(v_texOrigin.x * 0.5), 1.0),
            mod((v_texCoord.y − v_texOrigin.y) * v_texCoord.w, 0.25) + v_texOrigin.z
        };
        lowp vec4 bumpColor = texture2D(u_texture, bumpTiledUV);
        // Get the RGB channels components of the texel and color tint them using the
maxRGB technique
        lowp vec4 colorTex = texture2D(u_texture, v_texCoord.xy);
    // The bump pattern is overlayed on the color image
        gl_FragColor.rgb = BlendOverlay(
      bumpColor.a,
      MarRGB(
         colorTex.r * u_materialAmbient.rgb    /*bottom*/,
         colorTex.g * u_materialDiffuse.rgb    /*middle*/,
         colorTex.b * u_color4.rgb             /* top */
      )
   );
        gl_FragColor.a = 1.0;
}
```

Example code for setting up the shader program 414 is provided below:

```
                            shaders.xml
<Shader name="ProceduralBackgroundShader"
vertexShader="shaders/ProceduralBackgroundShader.vert"
fragmentShader="shaders/ProceduralBackgroundShader.frag">
   <Attribute name="a_position" input="Positions"> <DefaultValue
size="3" x="0" y="0" z="0" /> </Attribute>
   <Attribute name="a_texCoord" input="UVs"> <DefaultValue
size="2" x="0" y="0" />
</Attribute>
   <Attribute name="a_texCoord2" input="Colors2"> <DefaultValue
size="4" x="0" y="1" z="0" w="1" /> </Attribute>
   <Attribute name="a_tileSelected" input="RowSelected"> <DefaultValue
size="1" x="0"/> </Attribute>
</Shader>
```

The creation of the texture file 406 is described in more detail below. The game designer uses a graphical editor to generate a plurality of masks for forming a tile image. A mask may be a binary image whereby each pixel may take one of two possible values e.g. 0 (black) and 1 (white), an 8-bit grayscale image whereby a pixel takes a value between 0 (black) and 255 (white), or a colour image whereby each pixel is represented by 8-bits for each of the R, G, and B components of an RGB colour space.

Embodiments of the present invention are described herein using 8-bit depth information but embodiments extend to using any bit-depth channels. The texture file 406 can be stored in any format and any colour space provided the data stored in the image is properly scaled and presented separately in each channel or colour component as described below.

Figure 5:
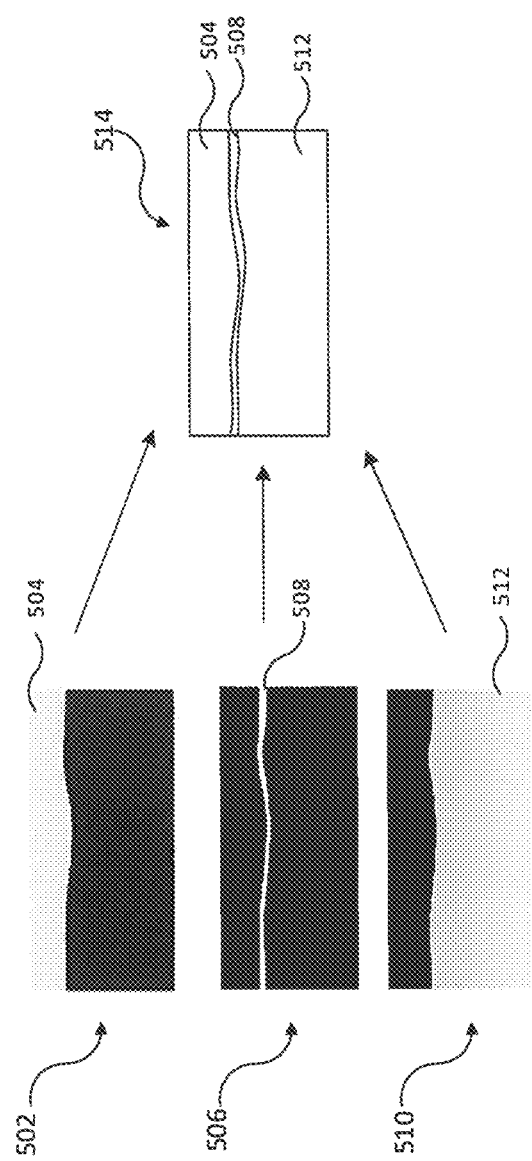
FIG. 5 illustrates predefined masks for composing a tile image.

Examples masks 502, 506, 510 for forming a tile image 514 are shown in FIG. 5. As shown in FIG. 5, the tile image has a first portion 504, a second portion 508 and a third portion 512. The masks 502, 506, 510 are described below in an example whereby they are 8-bit grayscale images. Each of the masks 502, 506, 510 define colour value ranges with smooth gradients and shapes of black areas that should be discarded when drawing the mask.

As shown in FIG. 5, a first mask 502 is responsible for drawing only portion 504 of the tile image 514. Thus first mask 502 comprises a portion 504 where colour is allowed to be added, and a remaining portion where colour is not allowed to be added. Data defining the first mask 502 is stored in a channel (e.g. the red channel) of the texture file 406. This data describes a smooth gradient based in two different color ranges. Pixels in the portion 504 of the first mask 502 are assigned a grayscale value between 128 and 255, these pixels will be tinted with an assigned tint color by the shader program 414 (as described by tint colour definitions 410) and added to the final color of the resulting image. Pixels in the remaining portion of the first mask 502 are assigned a grayscale value in the range between 0 and 127 and will be discarded when drawing it in the shader program 414. Thus it can be seen that the first mask 502 is responsible for drawing the portion 504 of the tile image 514.

A second mask 510 is responsible for drawing only portion 512 of the tile image 514. The second mask 510 comprises a portion 512 where colour is allowed to be added and a remaining portion where colour is not allowed to be added. Data defining the second mask 506 is stored in a separate channel (e.g. the blue channel) of the texture file 406. Pixels in the portion 512 of the second mask 510 are assigned a grayscale value between 128 and 255, these pixels will be tinted with an assigned tint color by the shader program 414 (as described by tint colour definitions 410) and added to the final color of the resulting image. Pixels in the remaining portion of the second mask 510 are assigned a grayscale value in the range between 0 and 127 and will be discarded when drawing it in the shader program 414. The second mask 510 will have exact same behavior and responsibility as that described above with reference to first mask 502, but will be tinted by a different color by the shader program 414 (as described by tint colour definitions 410), and will have a shape complementary to the first mask 502, where the portion of the first mask 502 assigned a low grayscale value range will overlap the portion of the second mask 510 assigned a high grayscale value range and vice versa. In other words, the second mask 510 is responsible for drawing the portion 512 of the tile image 514.

A third mask 506 is responsible for drawing only portion 508 of the tile image 514. The third mask 506 comprises a portion 508 where colour is allowed to be added and remaining portions where colour is not allowed to be added. Data defining the third mask 506 is stored in a channel (e.g. the green channel) of the texture file 406. Pixels in the portion 508 of the third mask 506 are assigned a grayscale value between 128 and 255, these pixels will be tinted with an assigned tint color by the shader program 414 (as described by tint colour definitions 410) and added to the final color of the resulting image. Pixels in the remaining portions of the third mask 506 are assigned a grayscale value in the range between 0 and 127 and will be discarded when drawing it in the shader program 414. Thus it can be seen that the third mask 506 is responsible for drawing the portion 508 of the tile image 514.

The masks 502, 506, 510 are intended for digestion by the shader program 414 to compose the tile image 514 for rendering on the display 145 of the computer device 100.

In a single 512×512 pixel image file (the texture file 406) it is possible to store predefined masks for forming up to eight different tile images of size 256×128 pixels in the red, green and blue channels of the texture file 406. That is, it is possible to store eight sets of predefined masks for composing a respective tile image in the texture file (each set comprising three predefined masks), wherein each of the predefined masks for composing a particular tile image are stored in a respective channel of the image file 406. This is illustrated in FIGS. 6a-c.

FIG. 6a shows a visual representation of eight masks (mask 1.1-8.1) that are each used in the rendering of a first portion of one of eight tile images. FIG. 6b shows a visual representation of eight masks (mask 1.2-8.2) that are each used in the rendering of a second portion of one of the eight tile images. FIG. 6c shows a visual representation of eight masks (mask 1.3-8.3) that are each used in the rendering of a third portion of one of the eight tile images.

A first set of masks comprising mask 1.1, mask 1.2 and mask 1.3 are used to render a first tile image, a second set of masks comprising mask 2.1, mask 2.2 and mask 2.3 are used to render a second tile image; a third set of masks comprising mask 3.1, mask 3.2 and mask 3.3 are used to render a third tile image; a fourth set of masks comprising mask 4.1, mask 4.2 and mask 4.3 are used to render a fourth tile image; a fifth set of masks comprising mask 5.1, mask 5.2 and mask 5.3 are used to render a fifth tile image; a sixth set of masks comprising mask 6.1, mask 6.2 and mask 6.3 are used to render a sixth tile image; a seventh set of masks comprising mask 7.1, mask 7.2 and mask 7.3 are used to render a seventh tile image; and an eighth set of masks comprising mask 8.1, mask 8.2 and mask 8.3 are used to render an eighth tile image.

To increase the aesthetics of the backgrounds and to yet further increase the number of possible combinations of tile images that may be delivered to the display 145 during execution of the game code, the designer may use a graphical editor to generate further masks that are used to provide visual effects (e.g. shadows and highlights) which are to be overlaid over a composed tile image (referred to above), these are referred to herein as a "bump pattern".

In the single 512×512 pixel image file (the texture file 406) it is possible to store up to four different bump pattern overlays, each bump pattern overlay comprising four different bump pattern tiles of 128×128 pixels in size. The bump pattern tiles may be binary images, grayscale images, or colour images.

Figure 6D:
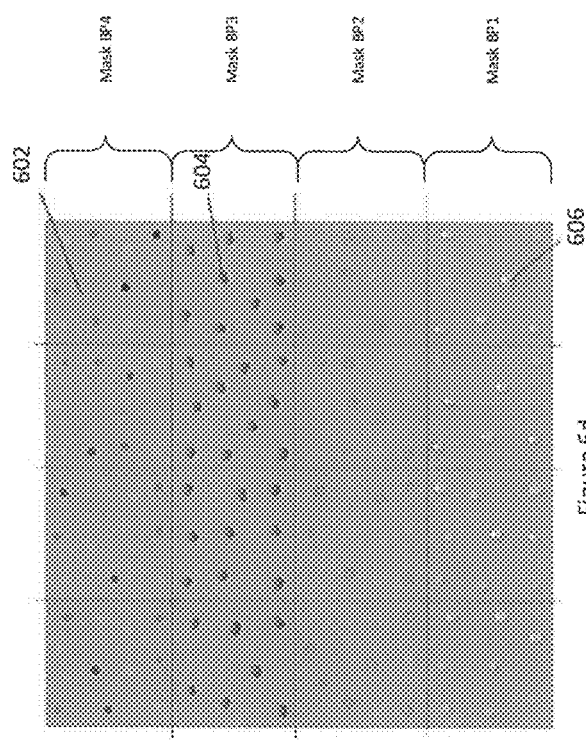
Figure 6C:
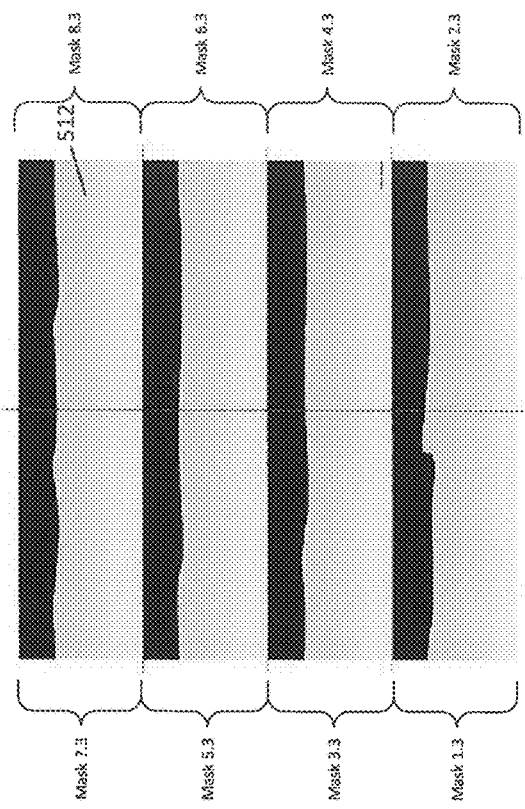

FIG. 6d illustrates the four different bump pattern overlays (Mask BP1, Mask BP2, Mask BP3, and Mask BP4). The bump pattern overlays are different to the masks described above in that now the images do not define maskable areas or smooth gradients, but patterns of small highlights and shadow elements that will give visual variety to the final composition. However, the bump pattern overlays are referred to herein sometimes as 'bump pattern masks' because they share some of the attributes of the other masks in how they are stored and transmitted in a 'game package'. Data defining each of the bump pattern masks is stored in the alpha channel of the texture file 406. This data includes for example a grayscale value of 127 for the background 602, a grayscale value of 0-126 for the shadow areas 604, and a grayscale value of 128-255 for the highlight areas 606.

A mask (or overlay) may be a binary image whereby each pixel may take one of two possible values e.g. 0 (black) and 1 (white), an 8-bit grayscale image whereby a pixel takes a value between 0 (black) and 255 (white), or a colour image whereby each pixel is represented by 8-bits for each of the R, G, and B components of an RGB colour space.

FIG. 7 illustrates example contents of the texture file 406. As shown in FIG. 7, the red channel of the texture file 406 comprises an array of data defining each of the predefined masks 1.1-8.1, the green channel of the texture file 406 comprises an array of data defining each of the predefined masks 1.2-8.2, the blue channel of the texture file 406 comprises an array of data defining each of the predefined masks 1.3-8.3, and the alpha channel comprises data defining each of the bump pattern masks BP1-4.

Referring back to FIG. 4, it can be seen that the data package 400 further comprises an image atlas 408. The image atlas 408 is a file describing what is depicted in the texture file 406 and where the predefined masks for forming each tile image are located within the texture file 406 using x,y (width,height) coordinates (texture coordinates). The image atlas 408 may for example be an Extensible Markup Language (XML) file, however it will be appreciated that the file may take other forms.

An example image atlas 408 for the texture file 406 is shown below:

```
<sprite n="tileimage1.png" x="0" y="1" w="256" h="126"/>
<sprite n="tileimage2.png" x="256" y="1" w="256" h="126"/>
<sprite n="tileimage3.png" x="0" y="129" w="256" h="126"/>
<sprite n="tileimage4.png" x="256" y="129" w="256" h="126"/>
<sprite n="tileimage5.png" x="0" y="257" w="256" h="126"/>
<sprite n="tileimage6.png" x="256" y="257" w="256" h="126"/>
<sprite n="tileimage7.png" x="0" y="385" w="256" h="126"/>
<sprite n="tileimage8.png" x="256" y="385" w="256" h="126"/>
```

The example image atlas 408 refers to each of the tile images as a "sprite" as each of the tile images is integrated into a larger scene (the texture file 406 comprises a plurality of tile images). The example image atlas 408 leaves a one pixel vertical border not covered by the rectangle definition at each sprite. This is a safety measure that allows the OpenGL stack to avoid artifacts when mapping the textures at the edge of two geometries (referred to herein as rectangles).

The data package 400 further comprises tint colour definitions 410 which describe which tint colours to apply to each of the predefined masks of selected tile images that are to form a background 304.

The tint colours that are to be applied to each of the predefined masks of selected tile images that are to form a background 304 are specific to an episode of levels that a user of the computer device 100 has progressed to in-game (is currently playing in) and are chosen by the game artist or game designer. For example, for a particular episode in the game, for each of the tile images forming the background 304, the tint colour definitions file 410 defines a first colour (expressed in accordance with the RGB colour model) to be applied to predefined mask n.1, a second colour (expressed in accordance with the RGB colour model) to be applied to predefined mask n.2, and a third colour (expressed in accordance with the RGB colour model) to be applied to predefined mask n.3, where n takes a value between one and eight depending on which tile image from the texture file is selected to be rendered.

The data package 400 may further comprise bump pattern definitions 412 which define which of the bumping pattern masks to select bump pattern tiles from, in forming the selected tile images that are to form a background 304, for each episode.

The game code 402 passes information to shader program 414 to display a randomly selected tile image on display 145 to form a background image 304. This information includes an indication of the selected tile image, tint colours to be applied to the predefined masks of the randomly selected tile image, and an indication of selected bump pattern tiles.

The shader program 414 is operable to map masks forming the selected tile image onto a rectangle (otherwise referred to in the art as a quad or geometry) having a defined default size, this processing is commonly referred to as "texturing" the rectangle. In particular, the shader program 414 combines all the received information together to compute final colors of the tile image.

The shader program 414 performs a colour operation by multiplying a tint colour by the grayscale value of each channel respectively. The algorithm implemented by the shader program 414 for computing a color is: at a specific point that is being rasterized (for drawing), for each predefined mask forming the tile image, get the colour component value (e.g. grayscale value) at the specific point and multiply the colour component value with the respective tint colour. These three colour values are then added (summed) together to form a "base colour". The colour component value (e.g. grayscale value) for the selected bump pattern tile from the alpha color component of the texture, at a specific point that is being rasterized, is then applied to the "base color" by the shader program 414 performing an overlay operation (mathematical calculation) to form the final color of the tile image.

The overlay operation is designed to increase the contrast and have very dark shadows and very white highlights. It comprises multiplying the grayscale value of the bump pattern tile ("bumpColour" in the formulae presented below) by the base color (baseColour in the formulae presented below).

For example if the bump pattern tile colour (e.g. grayscale value) at a point is less than or equal to 127, then the shader program 414 performs a multiply operation to form a final colour of the tile image e.g. final colour=2.0*bumpColour*baseColour, and if the bump pattern tile color (e.g. grayscale value) at a point is greater than or equal to 128 then the shader program 414 performs an inverse-multiply operation to form a final colour of the tile image e.g. final colour=1.0-2.0*(1.0-bumpColour)*(1.0-baseColour).

The inventors have found that this operation typically gives very black darks and very white highlights so it is preferable that the grayscale values of the predefined masks in the texture file 406 are tuned accordingly.

The colour operations described above are shown in FIG. 8 which illustrates operations performed by the shader program 414 in generating the seventh tile image which is formed using masks 7.1, 7.2 and 7.3.

Figure 8:
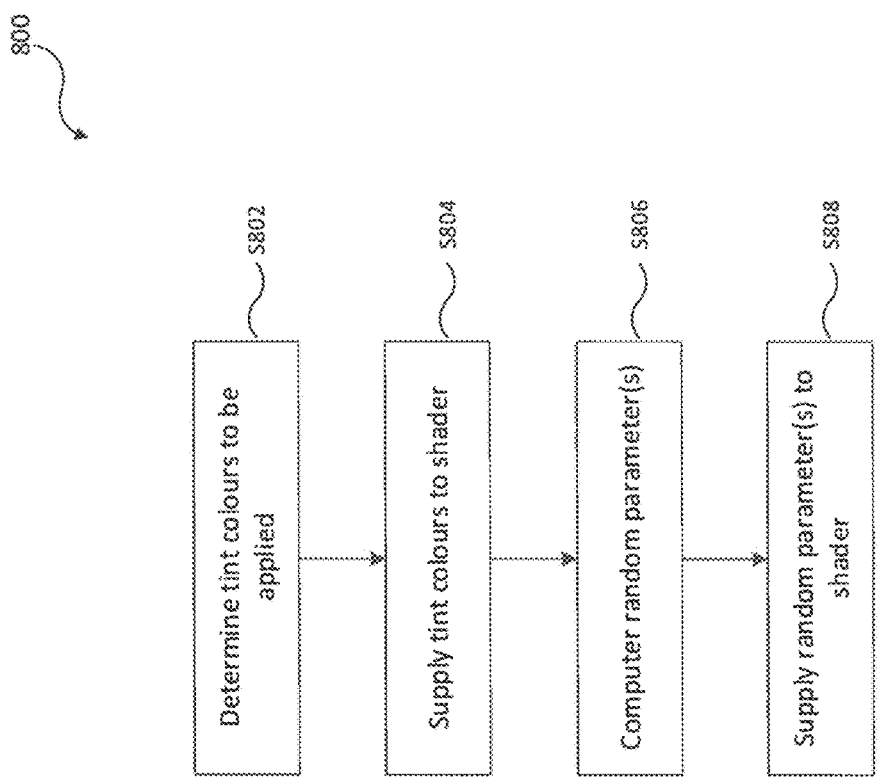
FIG. 8 is flow chart for a process performed by application code when executed on the computer device.

The shader program 414 performs a colour operation by multiplying a tint colour by the gray scale value of each channel respectively. In particular, FIG. 8 shows the shader program 414 multiplying a tint colour 802 to the predefined grayscale values in the predefined mask 7.1, multiplying tint colour 804 to the predefined grayscale values in the predefined mask 7.2, and multiplying tint colour 806 to the predefined grayscale values in the predefined mask 7.3. FIG. 8 further shows the shader program 414 overlaying bump pattern tiles randomly selected from a bump pattern mask associated with the episode of levels that a user of the computer device 100 has progressed to in-game, to form the final colours of the tile image.

The role of the game code 402 and how it passes information to shader program 414 such that thousands combinations of aesthetically pleasing backgrounds can be created that will not repeat to the human eye, will now be described.

The rectangle to be drawn comprises four vertices (two triangles). A vertex buffer is assigned to each vertex of the rectangle.

For each vertex of the rectangle, the vertex buffer associated with the vertex comprises: (i) texture coordinate positions for selected predefined mask tiles (e.g. masks X.1-X.3), (ii) texture coordinate positions for selected bump pattern tiles (e.g. tiles of masks BP1-BP4), and (iii) tint colours to be applied to each of the predefined masks of the selected tile image based on the tint colour definitions 410. All of this information is replicated for each vertex, and only texture coordinates and vertex position would change among two different vertexes.

During execution of the game code 402 on CPU 115, the game code 402 selects at random a tile image for display from the plurality of tile images stored in the texture file 406 (e.g. one of the eight tile images stored in the texture file 406), and a provides an indication of the selected tile image to the helper code 404.

In response to receiving the indication of the selected tile image, the helper code 404 is configured to query the image atlas 408 to determine the texture coordinates assigned to the selected tile image in the texture file (i.e. where the predefined masks for forming the selected tile image are stored in each channel of the texture file 406). The helper code 404 is configured to fill the vertex buffers with respective texture coordinates (the texture coordinates being different in each vertex buffer).

If bump pattern masks are stored in the alpha channel of the texture file 406, the helper code 404 queries the bump pattern definitions 412 to determine the bump pattern mask (e.g. one of BP1-BP4) associated with the episode of levels that a user of the computer device 100 has progressed to in-game (is currently playing in). The example texture file 406 shown in FIG. 6d has four different bump pattern masks stored in a respective row of 128 texel height in the texture file 406, each bump pattern mask comprises four different bump pattern tiles of size 128×128 pixels stored in a respective column of 128 texel width in the texture file 406.

The game code 402 randomly selects bump tiles (from the determined bump pattern mask) that are to be used by the shader program 414 to overlay over the set of predefined masks composing the selected tile image. A selection of a bump tile to start the overlay can be performed by randomly selecting a bump tile from the determined bump pattern mask. A further bump tile to continue the overlay can be selected based on being adjacent in the texture file 406 to the bump tile selected in the manner described above. Alternatively the selection of further bump tile may be selected in the manner described above (random selection of a bump tile from the determined bump pattern mask). The helper code 404 is configured to fill the vertex buffers with the texture coordinates for the selected bump pattern tiles (these texture coordinates being the same in each vertex buffer). Assuming that the texture defines 4×4 tiles, the game code selects the desired row from a file descriptor (adjustment parameter) written by the artist who designed the game. The file which describes the tint colours also describes which row of the bump patterns to use for a current game episode. To select the desired column, it uses a random number between 0 and 3 to select one of them. Once the tile (column, row) is selected, the helper code 404 computes the top left hand coordinate of the texture by multiplying the tile coordinates: (col*texture_width/4,row*texture_height/4). This gives the information to the helper class to place that information into the vertex buffer.

The game code 402 is further configured to determine which tint colours are to be applied to each of the predefined masks that are to form the tile image by querying the tint colour definitions 412 stored in memory 110 and finding the tint colours which are specific to the particular episode that the user is playing in. The helper code 404 is used to fill the vertex buffers with the tint colours to be applied to each of the predefined masks that are used to form the tile image (these tint colours being the same in each vertex buffer).

It will be appreciated that by randomly selecting a tile image from the texture file 406 and randomly selecting bump pattern tiles to overlay over the base colour of the tile image a large number of combinations of different backgrounds may be displayed, particularly if the shader program 414 uses multiple tile images (displayed adjacent to each other) in forming a background image for display on the computer device 100.

The game code 402 may perform further operations to increase the number of possible combinations.

To increase the sense of randomness, the game code 402 may select at random at least one shade adjustment parameter for adjusting at least one of the tint colours (defined in tint colour definitions 410) that are supplied to the shader program 414 and used to adjust the predefined colour values of the predefined masks. The game code 402 may perform the adjustment of the at least one tint colour using the shade adjustment parameter(s) prior to the tint colour information being placed in the vertex buffers by the helper code 404. Alternatively, the helper code 404 supplies the shade adjustment parameter(s) to the shader program 414 for use by the shader to perform the adjustment of the at least one tint colour using the shade adjustment parameter(s). The shade adjustment parameter(s) modify the shade of a tint colour (e.g. lighten or darken) and are constrained within threshold values such that the colour scheme associated with a particular episode of levels is not lost.

In a similar manner the helper code 404 may supply a shade adjustment parameter to the shader program 414 for use by the shader to adjust the grayscale values of the bump pattern tiles. For example a scalar value may be added to the formulae referred to above that tweaks the colour ("bumpColour") of the bump pattern tiles up or down by multiplication. The effect would be to have higher or lower contrast bump patterns applied, so they sometime appear darker or lighter than originally designed.

The game code 402 may determine that further random rotations and/or scale transformations of the bump pattern tiles should be applied. In this scenario, the helper code 404 passes information defining the rotations/transformations to the shader program 414 upon making such a determination.

In another example to increase the sense of randomness, the game code 402 may select a vertical scale adjustment parameter at random, and the helper code 404 uses the vertical scale adjustment parameter to adjust (i.e. scale) the vertical height of the rectangle that is to be textured prior to sending the rectangle to the OpenGL rendering pipeline to be processed later by shader program 414. Alternatively, the helper code 404 supplies the vertical scale adjustment parameter to the shader program 414 for use by the shader to adjust the vertical height of the rectangle that is to be textured prior to performing the texture mapping. The vertical scale adjustment parameter may for example be within the range of 1× and 3× (multiplicative factor range).

In another example to increase the sense of randomness, the game code 402 may determine at random that a composed tile image is to be flipped horizontally, and the helper code 404 passes a parameter indicating that the composed tile image is to be flipped horizontally to the shader program 414 upon making such a determination.

One or more of the above described techniques may be applied to control the composition of the tile image by the shader program 414.

Whilst the above process has been described above with reference to generating a single tile image, it will be appreciated that multiple tile images may be used to form an aesthetically pleasing full-screen background image.

Figure 9:
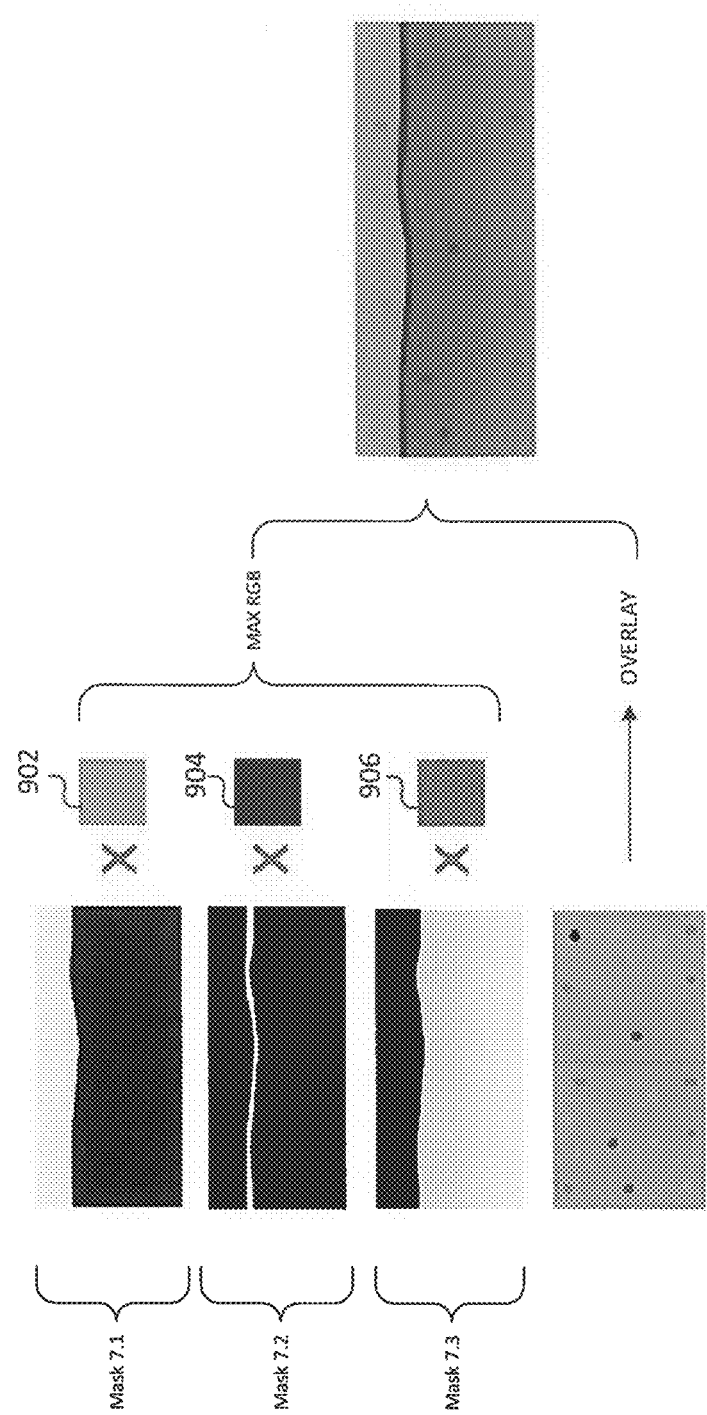
FIG. 9 illustrates operations performed by a shader program of the data package in generating a tile image.
Figure 10:
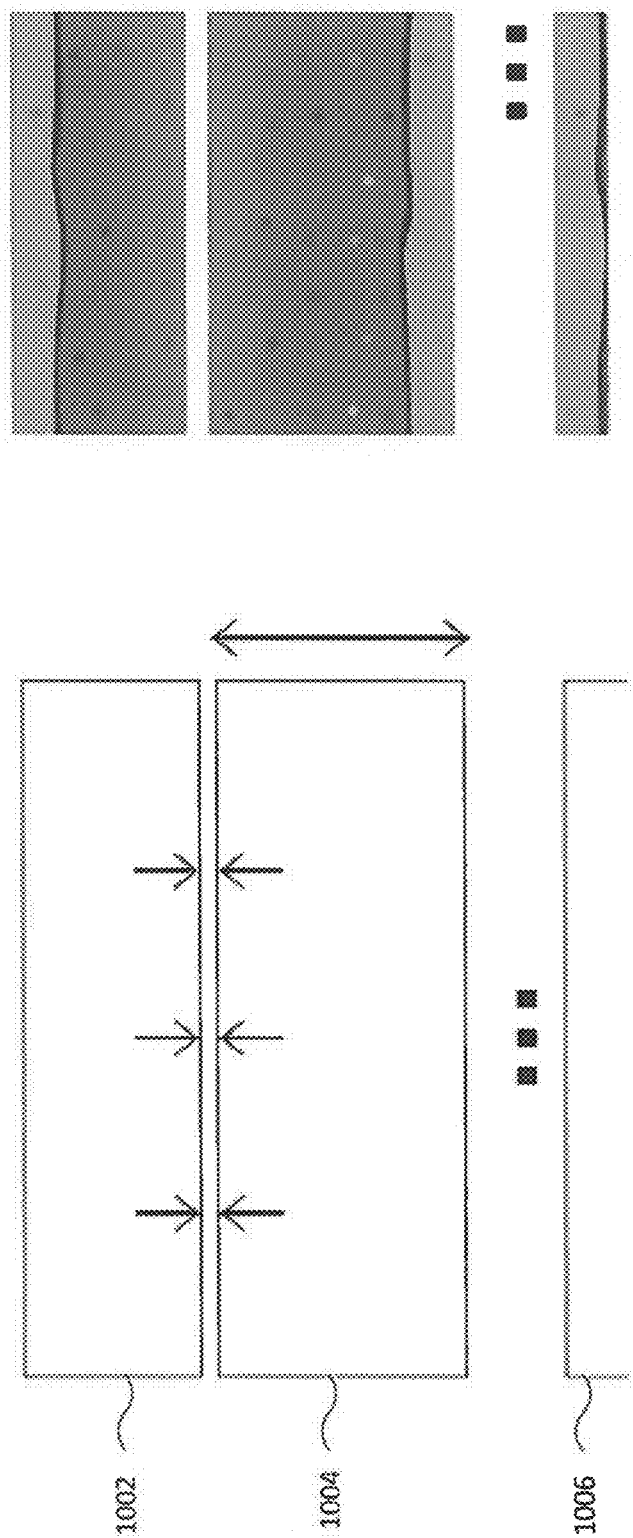
FIG. 10 illustrates operations performed by the shader program in forming a background image for display on the computer device.
Figure 11:
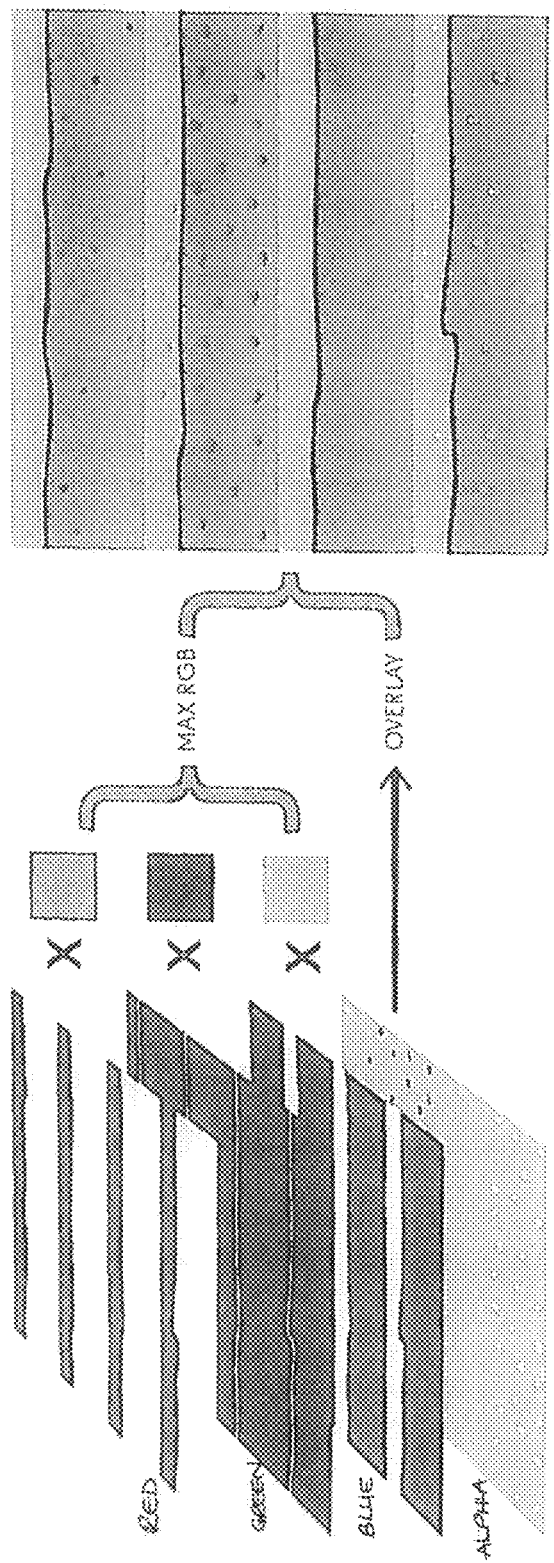
FIG. 11 shows overlaying masks.

FIG. 9 illustrates operations performed by the shader program 414 in forming a background image for display on the computer device 100 using multiple tile images.

To create a final background image, the shader program 414 creates a vertical strip of multiple rectangles (e.g. quads 902, 904, 906). The shader program 414 spans each of the rectangles horizontally to fill the display screen 145.

For each of the rectangles the shader program 414 is configured to use received parameters, as described above, to control the texture mapping process of predefined masks of the texture file 406 onto the rectangle to display a tile image forming the background image.

The game code 402 supplies parameters to the shader program 414 to ensure that the same tint colour is used for each opposing edge of each rectangle so as to keep a continuous gradient of colour between rectangles.

It will be appreciated that due to the format of the texture file 406 being exploited in the manner described above and the random parameters supplied to the shader program 414, thousands of different aesthetically pleasing backgrounds that are not repetitive and that change as the user advances can be created without the burden of increasing the final size of the data package 400.

The game code 402 supplies parameters to the shader program 414 to control the display of a background image when a user uses the input device 105 to enter a room. A user can make selections of game elements displayed in the game area using input device 105 to dig a path down between an entry point and exit point to reach different sub levels (rooms). Once a user advances in the game to a certain exit point to reach a different room, the game code 402 moves the previously displayed game area and tile images forming the background image up off screen and moves a new game area and tile images forming a new background image up (from off screen) to be displayed on display 145 in a seamless manner as if the game areas and tile images forming backgrounds were printed on a tape reel passing across the display 145.

The game may allow the user to travel sideways in certain levels to reach a different room. In embodiments of the invention a single full-screen background is generated for display on display 145, and an algorithm will keep on asking to generate and layout extra backgrounds, so as to be placed at the sides of the current background, this way the game can transition or move in any 2D direction without gaps. The game artists may design the predefined masks and bump pattern tiles so that they can be laid out in any direction and match perfectly when tiling full-screen generated background images, side to side or up & down.

Whilst it has been described above that tint colours (from tint colour definitions 410) are passed to the shader program 414 by way of vertex buffers, alternatively the tint colours may be passed to the shader program 414 by way of OpenGL uniforms.

The uniforms can be passed as static values to the shader program 414 by the use of a material in an xml scene file, they are color, ambient, and diffuse tags respectively in the example xml scene file provided below XML Scene file

```
<Material name="ProceduralBackgroundMaterial">
  <Blend enabled="false"/> <!-- Remove blending!! -->
  <Depth enabled="false" writeMask="false"/> <!-- Z-test not needed -->
  <Cull enabled="true" face="back"/>
  <Shader program="ProceduralBackgroundShader"/>
  <Color r="255" g="145" b="255"/> <!-- top layer color -->
  <Light enabled="true">
    <Ambient r="227" g="60" b="236"/> <!-- bottom layer color -->
    <Diffuse r="161" g="59" b="124"/> <!-- middle layer color -->
  </Light>
</Material>
```

Alternatively the helper code can dynamically apply different tint colour values each time:

ProceduralBackgroundHelper.cpp

```
// rectangleObject is a Renderable
rectangleObject->SetMaterialColor(topColorTint);
rectangleObject->SetAmbientColor(baseColorTint);
rectangleObject->SetDiffuseColor(middleColorTint);
```

Whilst embodiments of the present invention have been described above with reference to image texture data i.e. the predefined masks (for forming the different tile images) and the bump pattern masks, being stored in respective channels of a single image file, this is merely an example. For example, the data package 400 may comprise four image files, each image file storing one of the masks referred to above in a respective colour channel. Even when stored in multiple image files the masks are combined into a single texture of four colour components (channels), to be given to the GPU 125. The game code de-serializes all image files and combine them, for example, using OpenGL.

Whilst FIG. 4 shows the texture file 406, image atlas 408, tint colour definitions 410 and bump pattern definitions 412 being included in the data package 400 that is downloaded with the game code 402 and shader program 414, in other embodiments the texture file 406, image atlas 408, tint colour definitions 410 and bump pattern definitions 412 may be included in a separate data package to the game code 402 and shader program 414, that is transmitted to the computer device 100. For example this separate data package may be transmitted to the computer device 100 in response to the user of the computer device reaching a certain level, winning an in-game event, being active in the game for a certain time period etc.

Whilst embodiments have been described with reference to forming a background image for use in a computer game, embodiments of the present disclosure are not limited to such applications and extend to other forms of application such as communication programs, daily planners, ebook readers, geopositioning trackers, alert systems, etc. For example in the context of an instant messaging application, an area in which transmitted and received instant messages is displayed is typically superimposed over a background image, thus it will be apparent that embodiments disclosed herein can also be used in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method for controlling the display of a tile image on a display of the computer device, the method comprising:

storing in a computer memory at the computer device, image texture data comprising a plurality of sets of predefined masks, each set of predefined masks for forming a respective tile image;

selecting at random a tile image for display from a plurality of tile images;

determining a location of each mask in the set of predefined masks for forming the selected tile image, in the image texture data; and supplying an indication of said location to a shader program executed on the computer device to control the shader program to use the set of predefined masks to form the selected tile image on said display wherein each of the predefined masks for forming a tile image has a predefined color value for a respective portion of the tile image, and the method further comprises querying the computer memory of the computer device to determine tint colors to be applied to each of the predefined masks of the selected tile image, and supplying an indication of the determined tint colors to the shader program to adjust the predefined color value of each of the predefined masks of the selected tile image using the determined tint colors.

2. The method of claim 1, wherein the method further comprises selecting a shade adjustment parameter at random, and using the shade adjustment parameter to adjust at least one of the determined tint colours prior to supply to the shader program, or supplying the shade adjustment parameter to the shader program to adjust at least one of the determined tint colours.

3. The method of claim 2, wherein the code is method is implemented by computer game code executed on the computer device and said tint colours are determined based on a user's progression in the computer game.

4. The method of claim 1, wherein the method is implemented by computer game code executed on the computer device and said tint colours are determined based on a user's progression in the computer game.

5. The method according to claim 1, wherein each predefined mask comprises image texture data to render a portion of the tile image, wherein a tile image comprises multiple portions.

6. The method according to claim 5, wherein each portion comprises a rectangle having a long side and a short side being a vertical height in the image, the rectangles in a tile image defining strata for composing the image.

7. The method according to claim 6, wherein the method further comprises selecting a vertical scale adjustment parameter at random, and using the vertical scale adjustment parameter to adjust the vertical height of a rectangle onto which the predefined masks are to be mapped by the shader program prior to supply of the rectangle to the shader program, or supplying the vertical scale adjustment parameter to the shader program to adjust the vertical height of a rectangle onto which the predefined masks are to be mapped by the shader program.

8. The method according to claim 5, wherein the image texture data for predefined masks for rendering a portion of the tile image is stored in a respective channel of an image file, wherein each channel stores a plurality of predefined masks for creating that portion of the image, and wherein the set of predefined masks for rendering the tile image comprises a mask from each channel.

9. The method according to claim 8, wherein the image texture data comprises a plurality of pattern tiles for overlaying over the selected tile image, the plurality of pattern tiles stored in a further channel of said image file.

10. The method of claim 9, wherein the channels are of an image file format structured to hold red, green, blue and alpha colour data and adapted to hold image texture data.

11. The method of claim 8, wherein the channels are of an image file format structured to hold red, green, blue and alpha colour data and adapted to hold image texture data.

12. The method according to claim 1, wherein the image texture data comprises a plurality of overlay pattern tiles for overlaying over the selected tile image, and the method further comprises:

selecting at random overlay pattern tiles from the plurality of pattern tiles;

determining a location of the selected overlay pattern tiles in the image texture data; and supplying an indication of said location to the shader program to control the shader program to overlay the selected overlay pattern tiles over the selected tile image on said display.

13. The method according to claim 12, wherein the method is implemented by computer game code and the pattern tiles are selected from a set of pattern tiles determined based on a user's progression in the computer game.

14. The method according to according to claim 12, wherein the overlay pattern tiles are binary images, grayscale images or colour images.

15. The method according to claim 1, further comprising determining at random that the tile image is to be flipped horizontally prior to display, and controlling the shader program to flip the tile image prior to display based on said determination.

16. The method according to claim 1, wherein the predefined masks are binary images, grayscale images or colour images.

17. A computer implemented method for controlling the display of a tile image on a display of the computer device, the method comprising:

storing in a computer memory at the computer device, image texture data comprising a plurality of sets of predefined masks, each set of predefined masks for forming a respective tile image;

selecting at random a tile image for the display from a plurality of tile images;

determining a location of each mask in the set of predefined masks for forming the selected tile image, in the image texture data; and supplying an indication of same location to a shader program executed on the computer device to control the shader program to use the set of predefined masks to form the selected tile image on said display, wherein the image text data comprises a plurality of overlay pattern tiles overlaying over the selected tile image, and the method further comprises:

selecting at random overlay pattern tiles from the plurality of pattern tiles;

determining a location of the selected overlay pattern tiles in the image texture data; and supplying an indication of said location to the shader program to control the shader program to overlay the selected overlay pattern tiles over the selected tile image on said display, wherein the selected overlay patterns are defined by colour values in the image texture data, and the method further comprises selecting a shade adjustment parameter at random, and supplying the shade adjustment parameter to the shader program to adjust the colour values of the selected overlay pattern tiles.

18. A computer program product for controlling the display of a tile image on a display of a computer device, the computer program product comprising code embodied on a non-transitory computer-readable medium and being configured so as when executed on a processor of the computer to:
supply image texture data to a shader program executed on the computer device, the image texture data comprising a plurality of sets of predefined masks, each set of predefined masks for forming a respective tile image;
select at random a tile image for display from a plurality of tile images;
determine a location of each mask in the set of predefined masks for forming the selected tile, in the image texture data; and
supply an indication of said location to a shader program to control the shader program to use the set of predefined masks to form the selected tile image on said display, wherein each of the predefined masks for forming a tile image has a predefined color value for a respective portion of the time image, and the program product is configured to query a computer memory of the computer device to determine tint colors to be applied to each of the predefined masks of the selected tile image, and supply an indication of the determined tint colors to the shader program to adjust the predefined color value of each of the predefined masks of the selected tile image using the determined tint colors.

19. A computer device comprising:
a memory adapted to store image texture data;
a display for displaying tile images; and
processing components configured to execute game code to a shader program, and carry out the following steps:
storing in the computer memory at the computer device, image texture data comprising a plurality of sets of predefined masks, each set of predefined masks for forming a respective tile image;
selecting at random a tile image for display from a plurality of tile images;
determining a location of each mask in the set of predefined masks for forming the selected tile image, in the image texture data; and
supplying an indication of said location to the shader program executed on the computer device to control the shader program to use the set of predefined masks to form the selected tile image on said display, wherein each of the predefined masks for forming a tile image has a predefined color value for a respective portion of the tile image, and the processing components are configured to query the memory of the computer device to determine tint colors to be applied to each of the predefined masks of the selected tile image, and supplying an indication of the determined tint colors to the shader program to adjust the predefined color value of each of the predefined masks of the selected tile image using the determined tint colors.

20. A computer device according to claim 19, wherein the processing apparatus comprises a graphical processing unit configured to execute the shader program and a central processing unit configured to execute the game code.

21. A computer device configured to generate and transmit a computer game code package to each of a plurality of user devices, wherein the computer game code package comprises:
a computer program product embodied on a non-transitory computer-readable medium and configured so as, when executed on a processor of the computer, to:
supply image texture data to a shader program executed on the computer device, the image texture data comprising a plurality of sets of predefined masks, each set of predefined masks for forming a respective tile image;
select at random a tile image for display from a plurality of tile images;
determine a location of each mask in the set of predefined masks for forming the selected tile, in the image texture data;
supply an indication of said location to a shader program to control the shader program to use the set of predefined masks to form the selected tile image on said display; and
query computer memory of the computer device to determine tint colors to be applied to each of the predefined masks of the selected tile image;
a shader program adapted to be executed on each user device and to receive image texture data from the computer program product and to use a set of predefined masks in the image texture data to form a selected tile image on a display of each user device; and
an image file containing the image texture data comprising a plurality of sets of predefined masks, each set of predefined masks for forming a respective tile image,
wherein each of the predefined masks for forming a tile image has a predefined color value for a respective portion of the tile image, and wherein said computer program product is further configured so as to supply an indication of the determined tint colors to the shader program to adjust the predefined color value of each of the predefined masks of the selected tile image using the determined tint colors.

22. A method of producing a tile image to be displayed comprising:
combining a first greyscale image, said first greyscale image having a greyscale value for a first portion of the image, a second greyscale image, said second greyscale image having a greyscale value for second portion of the image, said first portion and second portions separated by a boundary, and a third greyscale image, said third greyscale image having a greyscale value for the boundary;
applying a tint colour to each of the greyscale images, whereby the greyscale value of each image is adjusted by the tint colours;
overlaying over the first, second and third portions of the image a fourth greyscale image, said fourth greyscale image comprising a pattern for the tile.

23. A method according to claim 22, further comprising storing each of the greyscale images in a colour channel.

24. A method according to claim 22, comprising storing greyscale images relating to a plurality of tile images in a colour channel.

25. A method according to claim 24, comprising selecting a tile image for display at random from the plurality of tile images.

26. A method according to claim 22, comprising applying a vertical scale to each tile image.

27. A computer implemented method for controlling the display of a tile image on a display of the computer device, the method comprising:
storing in a computer memory at the computer device, image texture data comprising a plurality of sets of predefined masks, each set of predefined masks for forming a respective tile image;
selecting at random a tile image for display from a plurality of tile images;

determining a location of each mask in the set of predefined masks for forming the selected tile image, in the image texture data; and supplying an indication of said location to a shader program executed on the computer device to control the shader program to use the set of predefined masks to form the selected tile image on said display, wherein each of the predefined masks for forming a tile image has a predefined colour value for a respective portion of the tile image, and the method further comprises querying computer memory of the computer device to determine tint colours to be applied to each of the predefined masks of the selected tile image, and supplying an indication of the determined tint colours to the shader program to adjust the predefined colour value of each of the predefined masks of the selected tile image using the determined tint colours, wherein each predefined mask comprises image texture data to render a portion of the tile image, wherein a tile image comprises multiple portions and wherein the image texture data for predefined masks for rendering a portion of the tile image is stored in a respective channel of an image file, wherein each channel stores a plurality of predefined masks for creating that portion of the image, and wherein the set of predefined masks for rendering the tile image comprises a mask for each channel.

* * * * *